Aug. 28, 1945.      W. McK. MARTIN      2,383,507
CONTAINER FILLING SYSTEM
Filed Dec. 2, 1941
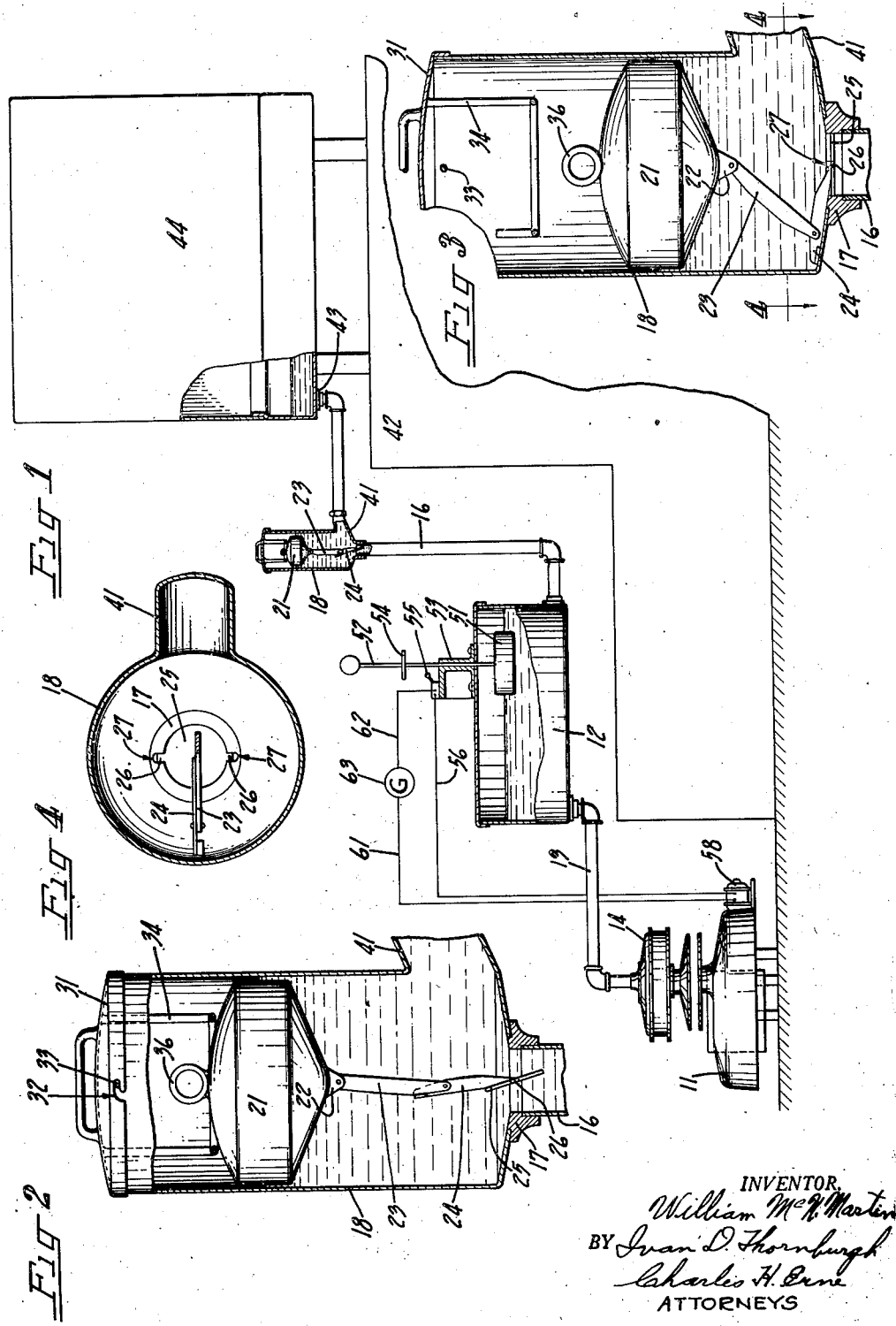
INVENTOR
William McK. Martin
BY Ivan D. Thornburgh
Charles H. Erne
ATTORNEYS Patented Aug. 28, 1945

2,383,507

UNITED STATES PATENT OFFICE 2,383,507

CONTAINER FILLING SYSTEM

William McK. Martin, Maywood, Ill., assignor to American Can Company, New York, N. Y., a corporation of New Jersey Application December 2, 1941, Serial No. 421,353

1 Claim. (Cl. 226—129)

The present invention relates to a machine for filling into containers liquid products which have a tendency to form foam on the surface of the liquid when agitated in the presence of air and has particular reference to devices for maintaining the supply lines connecting with the filling machine free of air so that foaming of the liquid in the lines will be prevented.

In handling certain kinds of liquid products in filling machines, it has been found that excessive foaming of the liquid sometimes takes place due to entrainment of air as liquid flows from a higher to a lower level and this foaming often results in undue clogging of the machine and inaccurate filling of the containers. Homogenized milk is an example of such a foaming liquid. It has been found that excessive foam encountered in handling homogenized milk in the dairies is due to the effect of homogenization on the stability of the foam rather than to the mechanical whipping effect of the homogenization process in producing the foam. The increased stability of the foam results in its accumulation in the supply lines wherever aeration occurs.

The instant invention contemplates overcoming this difficulty by providing devices which prevent this aeration of the milk in the supply lines.

An object, therefore, of the invention is the provision of devices for preventing foaming of liquids, in supply lines wherein the supply lines are maintained free of air by regulation of the liquid levels within the lines, means being provided to insure against the entrance of air at both the machine and supply ends of the line.

Numerous other objects and advantages of the invention will be apparent as it is better understood from the following description, which, taken in connection with the accompanying drawing, discloses a preferred embodiment thereof.

Referring to the drawing:

Figure 1 is a schematic view illustrating an apparatus embodying the instant invention, with parts broken away and parts shown in section, the view also showing a wiring diagram of the electric devices used in the apparatus;

Figs. 2 and 3 are enlarged sectional details of a float valve used in the apparatus, the views showing the movable parts of the valve in different positions, with parts broken away; and Fig. 4 is a horizontal section taken substantially along the line 4—4 in Fig. 3.

As a preferred embodiment of the instant invention the drawing illustrates a filling machine 11 (Fig. 1), with its cooperating supply lines and tanks, for filling milk into containers. The filling machine preferably is of the character disclosed in United States Patent 2,222,617, issued November 26, 1940, to John M. Hothersall.

The milk to be filled into the containers flows into the filling machine by gravity from a storage tank 12 which is disposed at a level above the filling machine and which is connected by a supply pipe 13 to the filling machine. One end of the pipe is connected to the bottom of the storage tank while the other end is connected to a reservoir 14 which constitutes a part of the filling machine.

The storage tank 12 receives its supply of milk by way of a vertical supply pipe 16, the lower end of which is connected into the tank. The upper end of the pipe is secured in an outlet valve seat 17 formed in the bottom of a vertical float valve casing 18 which constitutes an auxiliary supply tank.

Within the casing there is a float 21 (Figs. 2 and 3) having a depending lug 22 at the bottom which is connected by a link 23 to an arm 24 which extends out from a flat butterfly valve 25. The valve is formed with a pair of trunnions 26 which extend outwardly from opposite sides of the valve. These trunnions are disposed in half-bearings 27 (see also Fig. 4) formed in the top of the valve seat 17. The valve is located in the seat adjacent the upper end of the pipe 16 and functions to close off the entrance to the pipe, as will be explained hereinafter.

The top of the valve casing 18 is closed off with a slip cover 31 having bayonet locking notches 32 for engagement with pins 33 in the casing to retain the cover in place. This cover is formed with a stop ring unit 34 which extends down into the valve casing and serves as a stop for limiting the upward travel of the float 21 so that the valve trunnions 26 will not become unseated from their bearings 27. The top of the float carries a ring 36 which is utilized for lifting the float and its connecting valve out of the casing for cleaning, when the cover 31 is removed.

The float valve casing 18 is formed further with an angularly disposed inlet tube 41 which extends upwardly from the bottom of the casing adjacent the valve outlet seat 17. At its upper end the inlet tube connects with a horizontal supply pipe 42 which leads from an outlet connection 43 formed in the bottom of a cooling or supply tank 44 in which the milk is retained while being cooled.

The cooling tank is disposed on a level above the storage tank 12 and receives its supply of milk from any suitable source. For best results the relative elevation of the float valve casing 18 should be such that its float 21 is slightly higher than the outlet connection 43 in the bottom of the cooling tank 44 when the valve is in its closed position.

Hence milk flowing from the cooling tank 44 by way of the horizontal supply pipe 42 fills the float valve casing 18 to a predetermined level and flows from this casing by way of the pipe 16 into the storage tank 12 from which it is used as needed by the filling machine. After once being filled, the supply line and the float valve casing 18 remain filled with milk. In this condition the float 21 rises within the casing (as shown in Fig. 2) and thus through its link 23 and arm 24 holds the valve 25 in open position as shown.

If for any reason the level of the milk in the cooling tank 44 drops to a position near the bottom of the tank, the level of the milk in the float valve casing 18 also drops and thus allows the float 21 to descend and thereby to rock the valve 25 in its seat 17. Before the level of the milk in the cooling tank can drop far enough to expose the outlet connection 43 and admit air from the tank into the supply line, the float falls sufficiently to close the valve 25.

Closing of the valve 25 therefore stops the flow of milk from the cooling tank and thus the entrance to the outlet connection in the tank is prevented from being exposed. In this manner the float valve maintains the level of the milk in the supply line sufficiently above the outlet from the cooler to prevent air-entrainment in the supply lines and this prevents the forming of foam or the carrying of foam from the cooling tank into the lines, as hereinbefore mentioned.

As a safeguard against entrainment of air in the supply lines by way of the filling machine and of the lines a safety float 51 (Fig. 1) is provided in the storage tank 12. This safety float rides on the surface of the milk in the tank. The float is formed with a long guide rod 52 which extends up through a stuffing box 53 on the top of the tank. The rod is formed with a collar 54 which is so located that when the level of the milk in the tank drops to a dangerously low level, the falling float brings the collar into actuating engagement with a normally closed electric stop switch 55.

The stop switch 55 is connected by a lead wire 56 to an electric motor 58 which constitutes the source of power for the filling machine 11. The motor and the switch are also connected by wires 61, 62 to a suitable source of electric energy such as a generator 63. Thus when the switch 55 is opened by the falling safety float 51, the circuit to the motor is broken and the motor ceases operation. This stops the filling machine and thus stops the drawing of the milk from the storage tank until the latter is replenished. In this manner entrainment of air in the supply lines is prevented from this end of the system.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A system for filling into containers liquid products having a tendency to foam, comprising a filling machine from which the liquid is drawn for filling into the containers, said machine having means for operating the same, a supply pipe line connecting with said filling machine to supply the liquid thereto, an auxiliary supply tank having an inlet and outlet through which the liquid flows into said pipe line, a main supply tank having an outlet connection from which the liquid flows into said auxiliary supply tank, float controlled valve means disposed in said auxiliary supply tank for regulating the flow of liquid from said main supply tank and through said auxiliary tank outlet to said pipe line, a storage tank interposed in said pipe line between said filling machine and said auxiliary supply tank, float means for controlling the liquid level in said storage tank, the inlet and outlet of said auxiliary supply tank being each disposed at a level beneath the outlet connection of said main supply tank, and means actuated by said float for stopping the operation of said machine operating means when the liquid in said storage tank falls below a predetermined level, whereby the described flow of liquid is maintained only as long as there is sufficient liquid in said main supply tank to prevent entrainment of air into said pipe line so that the liquid delivered to the filling machine will be prevented from foaming.

WILLIAM McK. MARTIN.